(12) United States Patent
Roodenburg et al.

(10) Patent No.: US 7,255,515 B2
(45) Date of Patent: Aug. 14, 2007

(54) MARINE PIPELAY SYSTEM AND METHOD

(75) Inventors: Joop Roodenburg, Delft (NL); Pieter Dirk Melis van Duivendijk, Missouri City, TX (US); Anne Klaas de Groot, Sugar land, TX (US)

(73) Assignee: Itrec B.V., Schiedam (NL)

( * ) Notice: Subject to any disclaimer, the term of this patent is extended or adjusted under 35 U.S.C. 154(b) by 0 days.

(21) Appl. No.: 10/861,941

(22) Filed: Jun. 4, 2004

(65) Prior Publication Data
US 2005/0207849 A1    Sep. 22, 2005

Related U.S. Application Data

(60) Provisional application No. 60/555,154, filed on Mar. 22, 2004.

(51) Int. Cl.
*F16L 1/15*    (2006.01)
(52) U.S. Cl. ...................................... 405/170; 405/169
(58) Field of Classification Search ................ 405/158, 405/166, 169, 170; 254/245, 254
See application file for complete search history.

(56) References Cited
U.S. PATENT DOCUMENTS

| | | | |
|---|---|---|---|
| 3,266,256 A | 8/1966 | Postlewaite | 61/72.3 |
| 3,440,826 A | 4/1969 | Kline | 61/72.3 |
| 3,581,506 A | 6/1971 | Howard | 61/72.3 |
| 3,934,647 A | 1/1976 | Bokenkamp | 166/0.5 |
| 4,068,490 A | 1/1978 | Jegousse | 61/108 |
| 4,472,079 A | 9/1984 | Langner | 405/167 |
| 5,449,252 A * | 9/1995 | Maloberti et al. | 405/166 |
| 5,464,307 A | 11/1995 | Wilkins | 405/166 |
| 6,352,388 B1 | 3/2002 | Sequin | 405/166 |
| 6,361,250 B1 | 3/2002 | de Varax | 405/158 |

* cited by examiner

*Primary Examiner*—Sunil Singh
(74) *Attorney, Agent, or Firm*—Buskop Law Group, PC; Wendy Buskop

(57) ABSTRACT

The marine pipelaying system for vertical or near vertical laying of an offshore pipeline includes a main supporting structure; a pipe connecting station, wherein a pipe section is connected to an uppermost end of a previously launched pipeline; a static clamp adapted for releasably securing the uppermost end of the previously launched pipeline, wherein the static clamp is adapted to support the weight of the previously launched pipeline; a mobile clamp adapted for releasably securing the previously launched pipeline at a position below the static clamp, wherein the mobile clamp is adapted to support the weight of the offshore pipeline as the offshore pipeline is released from the static clamp; and a mobile clamp hoist connected to the mobile clamp.

29 Claims, 17 Drawing Sheets

MARINE PIPELAY SYSTEM AND METHOD

The present application claims priority to U.S. Provisional Patent Application Ser. No. 60/555,154 filed on Mar. 22, 2004.

FIELD

The present embodiments relate to the vertical or near vertical laying of an offshore pipeline, particularly in deepwater.

BACKGROUND

For laying of offshore pipelines, the commonly known technique is referred to as the S-lay technique. In the S-lay technique, pipe sections are added to the previously launched pipeline in a horizontal position on a lay barge. The pipeline then curves over the stern of the barge, angles down toward the seabed, and curves back to horizontal and lays on the seabed. The profile of the pipeline from the lay barge to the seabed is in the form of a long "S". Although S-lay technique has been widely utilized, the technique is limited to certain conditions, such as to limited water depth.

As an alternative, the J-lay technique has been developed. The J-lay technique is especially advantageous for deep water pipe laying. In the J-lay technique, pipe sections are added to the previously launched pipeline in an essentially vertical position. The pipeline runs down toward the seabed, curves back to horizontal, and lies on the seabed. The profile of the pipeline from the lay barge to the seabed is in the form of a long "J". The definition of deep water, when referring to the use of J-lay technique, is a direct function of pipe diameter. This relationship is a result of the minimum water depth required for pipe of a certain diameter to achieve the proper flex from the vertical to the horizontal during the vertical laying operation.

Many different designs for J-lay technique apparatus are known in the current art. Many of the designs include a pivotable tower construction with a hoist system and a pipeline hoist cable suspended from the top of the tower. At the lower end of the tower, a static clamp is provided for holding the previously launched pipeline. The tower is provided with a mobile clamp that can engage the upper end of a new pipe section. The lower end of a new pipe section is connected to the previously launched pipeline, so that during a controlled lowering of the mobile clamp (after the static clamp has been released), the pipeline is lowered and a further new pipe section can be connected to the pipeline. Since the weight of the pipeline in deepwater situations can be enormous (several hundreds of tons), an extremely sturdy design of the tower is required.

Wilkens U.S. Pat. No. 5,464,307 discloses a J-lay technique system, wherein the tower extends downwardly from the deck of the vessel, essentially into the water. The static clamp in the Wilkens reference is provided at the lower end of the tower. The mobile clamp is movable up and down along a track formed in the tower and arranged above the static clamp. In another embodiment of Wilkens a stinger can extends downwardly from the static clamp. The static clamp in the Wilkens reference is mounted at deck level. The stinger extends into the water. The mobile clamp engages on the pipeline at a position below the static clamp and is guided along the stinger.

In many drilling techniques, vessels, particularly semi-submersible drilling vessels, are not used efficiently since drilling activities are not always needed while the vessel is under contract. Also other types of vessels are not used efficiently because those are designed for only one purpose. The Wilkens reference discloses an attempt to modify drilling vessels into pipe laying vessels. This was not successful.

Other references incorporated into this application include de Varax U.S. Pat. No. 6,361,250, and Seguin U.S. Pat. No. 6,352,388.

A need exists for an object to provide an improved pipelaying system for vertical or near vertical marine pipe laying, in particular in deepwater. A need exists for a (semi-submersible) drilling vessel that can be used effectively as pipe laying vessel for the vertical or near vertical laying of offshore pipelines. A need also exists for a floating production vessel that can be used effectively also as pipe laying vessel for the vertical or near vertical laying of offshore pipelines.

A need exists for a more efficient method for the vertical or near vertical laying of offshore pipelines.

SUMMARY

The improved marine pipelaying system for vertical or near vertical laying of an offshore pipeline described herein includes a main supporting structure; a pipe connecting station; a static clamp; a mobile clamp; and mobile clamp lowering means. The pipe section is connected to an uppermost end of a previously launched pipeline. The static clamp is adapted for releasably securing an uppermost end of a previously launched pipeline. The static clamp is adapted to support the weight of the previously launched pipeline.

The mobile clamp is adapted for releasably securing the previously launched pipeline at a position below the static clamp. The mobile clamp is adapted to support the weight of the pipeline as the pipeline is released from the static clamp. The mobile clamp is lowered using mobile clamp lowering means. The pipeline is clamped by the mobile clamp in an upper position while the pipeline is supported by the static clamp. The static clamp is released and the mobile clamp and pipeline are lowered to a lower position. In the lower position, the static clamp again secures the pipeline, after which the mobile clamp is released from the pipeline and moved back to its upper position. The mobile clamp is provided with pipeline engaging guide members, which engages the pipeline and guides the mobile clamp with respect to the pipeline during the movement of the mobile clamp back to the upper position thereof.

By providing the mobile clamp with pipeline engaging guide members (i.e., rollers), any further guide means for the mobile clamp (particularly guide means extending into the water) are unnecessary and are absent from the system. The system overcomes all problems associated with the prior art design wherein a stinger extending to below water level is needed to guide the mobile clamp.

BRIEF DESCRIPTION OF THE DRAWINGS

The present embodiments will be explained in greater detail with reference to the appended Figures, in which.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular embodiments herein and it can be practiced or carried out in various ways.

The embodied systems relate to a vertical or near vertical pipeline laying technique, such as the J-lay technique, for a pipeline launched from the vessel in an essentially vertical orientation. The systems provide an improved pipelaying system for vertical or near vertical marine pipelaying, particularly in deep water.

The methods described herein relate to an efficient method for the vertical or near vertical laying of offshore pipelines.

The systems provide a (semi-submersible) drilling vessel, which now can be used effectively also as pipe laying vessel for the vertical or near vertical laying of offshore pipelines. It must be understood that the systems and methods herein can also be used on other floating vessels, such as FPSO's, support vessels, pipe-lay vessels, anchor handling tugs etc.

Figure 1:
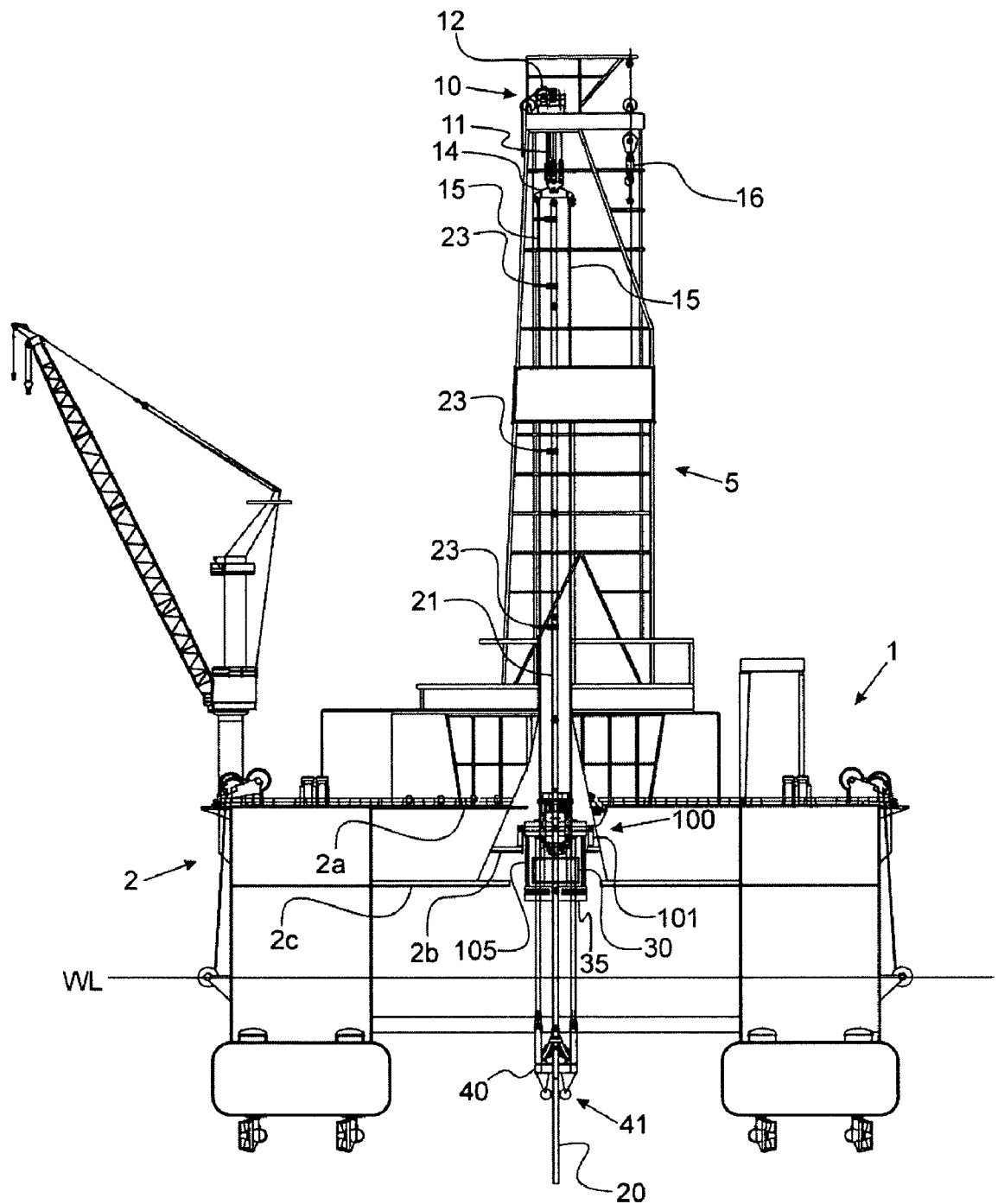
FIG. 1 depicts schematically a semi-submersible drilling rig provided with a pipelaying system.

With reference to the Figures, FIG. 1 shows a semi-submersible drilling vessel 1. The drilling vessel 1 has a non-submerging vessel structure 2 with multiple decks (upper deck 2a, lower deck 2b, and cellar deck 2c). The moonpool 3 extends through the upper deck structure 2a. In an alternative embodiment, the embodied methods can be performed without a moonpool and the pipe can be laid over the stern of the vessel.

A vertically extending drilling structure is associated with the moonpool 3 for performing drilling operations. An example of a drilling operation using the moonpool 3 is raising and lowering of the drill string through the moonpool 3. In one embodiment, a vertically extending derrick structure 5 can be erected over the moonpool 3. The derrick 5 typically has a lattice framework. As depicted in FIG. 1, the derrick structure 5 can be a four-sided structure. Alternative vertical drilling structures, such as a single mast structure adjacent the moonpool 3 or a gantry structure having legs at opposite side of the moonpool 3, can be included with the structure.

A drilling hoist 10 is associated with the derrick 5 for raising and lowering a drill string. The drilling hoist 10 includes a cable 11 and an associated winch 12. The cable 11 and winch 12 can be used for deepwater operation and thus able to withstand high loads, such as the entire drill string. FIG. 1 depicts the auxiliary hook 16 that can be used for drilling operations.

The winch 12 depicted in FIG. 1 is mounted on the top of the derrick 5, but other arrangements are also possible. The cable 11 can be a multiple fall cable.

The vessel 1 is not only suitable for drilling operations, but has the option to act as a pipe laying vessel for deepwater vertical or near vertical lying of a pipeline 20. For this purpose, the vessel 1 is equipped with a pipe laying system of the J-lay technique type, which will be described in further detail below.

Other types of vessels usable with the embodied systems and methods include FPSOs, well intervention vessels, support vessels, anchor handling vessels, pipe lay barges, typical barges, pipe lay vessels, and other similar offshore vessels.

In the pipelaying system, a pipe section 21 is connected to the upper end of the previously launched pipeline 20. The pipe section 21 can be a single pipe joint of standard length or a multiple pipe joint with pipe joint already connected. The pipe joint can be connected by any normal means, preferably by welding.

The pipe section 21 is held in an essentially vertical orientation within the space surrounded by the derrick 5. For this purpose, the derrick 5 is adapted as a pipe section holder for holding the pipe section 21. The pipe section 21 is essentially aligned with the uppermost end 20a of the previously launched pipeline 20. The pipe section 21 is held by several releasable pipe section holding elements 23 arranged in the derrick structure 5. The releasable pipe section holding elements 23 can be arranged to be movable with respect to the derrick structure 5.

For example, the pipe section holding element 23 can be arranged between an operative position, wherein the section holding elements 23 can hold a pipe section 21 during pipe laying activities, and a non-operative position when drilling operations are performed. For instance, each section holding element 23 is held on an associated articulated arm. As depicted in the FIG. 1, the section holding elements 23 can be provided at several height levels.

The space within the derrick 5 is such that, even in an inclined orientation (near vertical), the entire pipe section 21 is still within the derrick structure 5. The derrick structure 5 can include a storage rack for pipe sections.

Continuing with FIG. 1, the vessel 1 is provided with a connecting station 30. The lower end of the pipe section 21 is connected to the uppermost end 20a of the previously launched pipeline 20. In practice, the connecting station 30 could be a welding station or an automated welding station. Other connecting stations 30 are possible and known in the art. Additional connecting stations 30 could be provided in order to interconnect pipe joints to form a multi joint pipe section. These additional connecting stations 30 can be included at a higher level in the derrick 5.

A static clamp 35 of the pipe laying apparatus can hold the previously launched pipeline 20. This static clamp 35 is adapted for releasably securing an uppermost end of the previously launched pipeline 20 and is adapted to support the weight of the previously launched pipeline 20. The static clamp 35 can be of any suitable design. Such clamping designs are well known in the art and need no further elaboration.

The pipe laying apparatus includes a mobile clamp 40. The mobile clamp 40 can be of any suitable design and is adapted for releasably securing the previously launched pipeline 20 at a position below the static clamp 35. The mobile clamp 40 is adapted to support the weight of the pipeline 20 as the pipeline is released from the static clamp 35.

The cable 11 of the drilling hoist 10 is used to raise and lower in a controlled manner the mobile clamp 40 and the pipeline 20 held by the mobile clamp 40. In the figures, the cable 11 is connected to a spreader 14 and two cable parts 15 are suspended from remote locations of the spreader 14 so as to extend on opposite sides of the pipe section 21 and pipeline 20. The two cable parts 15 are each attached to the mobile clamp 40.

The mobile clamp 40 is provided with pipeline engaging guide members, such as rollers 41 and/or caterpillars, which engage the pipeline 20 and guide the mobile clamp with respect to the pipeline 20.

During a pipelaying operation, the previously launched pipeline 20 is clamped by the mobile clamp 40 in an upper position of the mobile clamp 40, while the pipeline 20 is supported by the static clamp 35. The upper end of the pipe section is fitted on the pipeline 20 within the welding station 30. The static clamp 35 is released to relieve the weight from the static clamp 35 by pulling upward mobile clamp 40.

After the static clamp 35 has been released, the mobile clamp 40 and the pipeline 20 are lowered to a lower position. The static clamp 35 then again secures the pipeline 20 near the uppermost end of the pipe section just fitted to the pipeline 20.

After securing the pipeline 20 with the static clamp 35, the mobile clamp 40 is raised back to an upper position, preferably using the drilling hoist 10. During the raising, the mobile clamp rollers 41 guide the clamp 40 with respect to the pipeline 20.

The length of the pipe section 21 fitted to the launched pipeline 20 can be such that the mobile clamp 40 is submerged in a lower position.

The sequence is repeated during the pipelaying operation.

Figure 2:
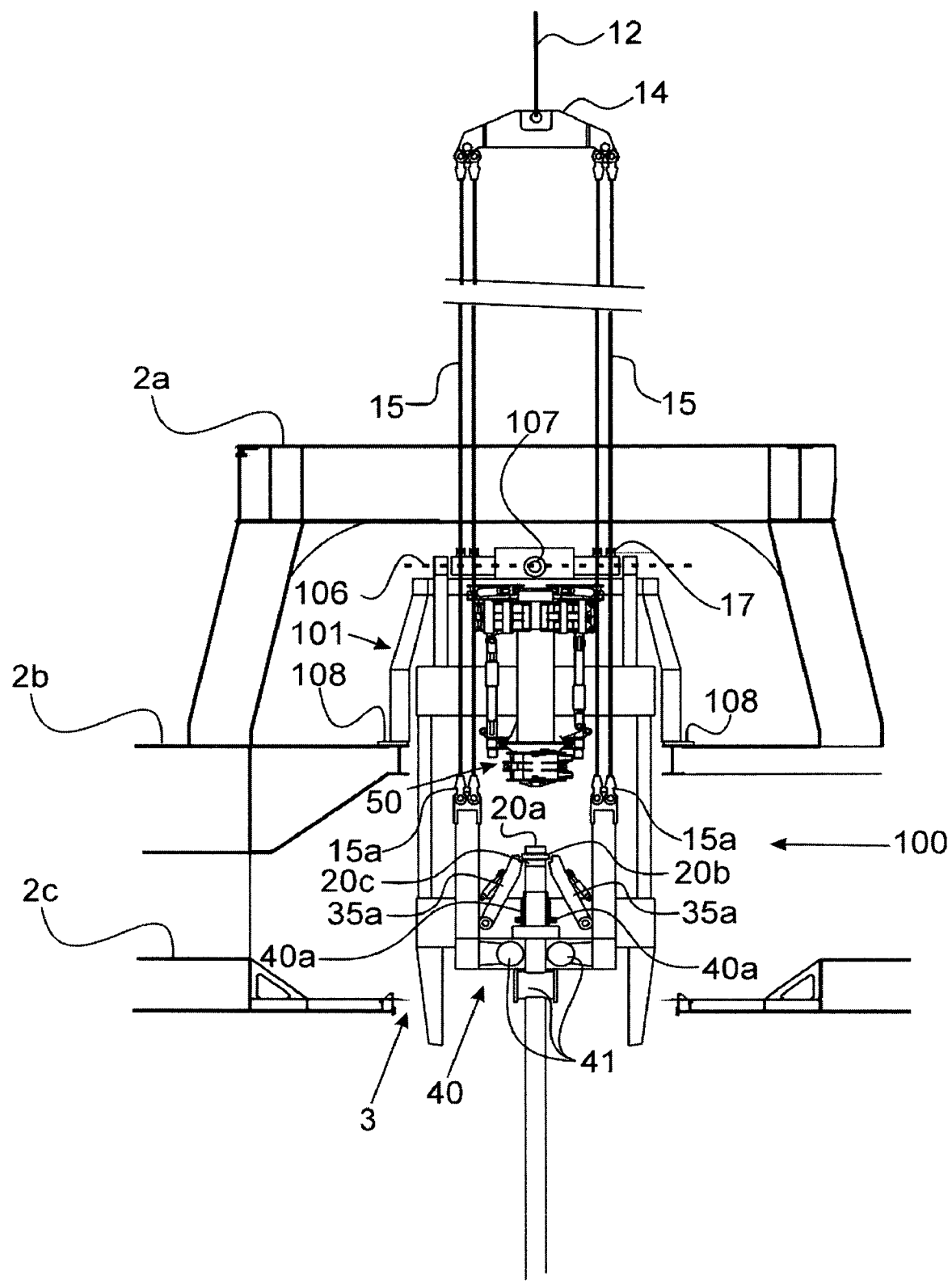
FIG. 2 depicts a front view of an exemplary embodiment of the pipelaying system.
Figure 3:
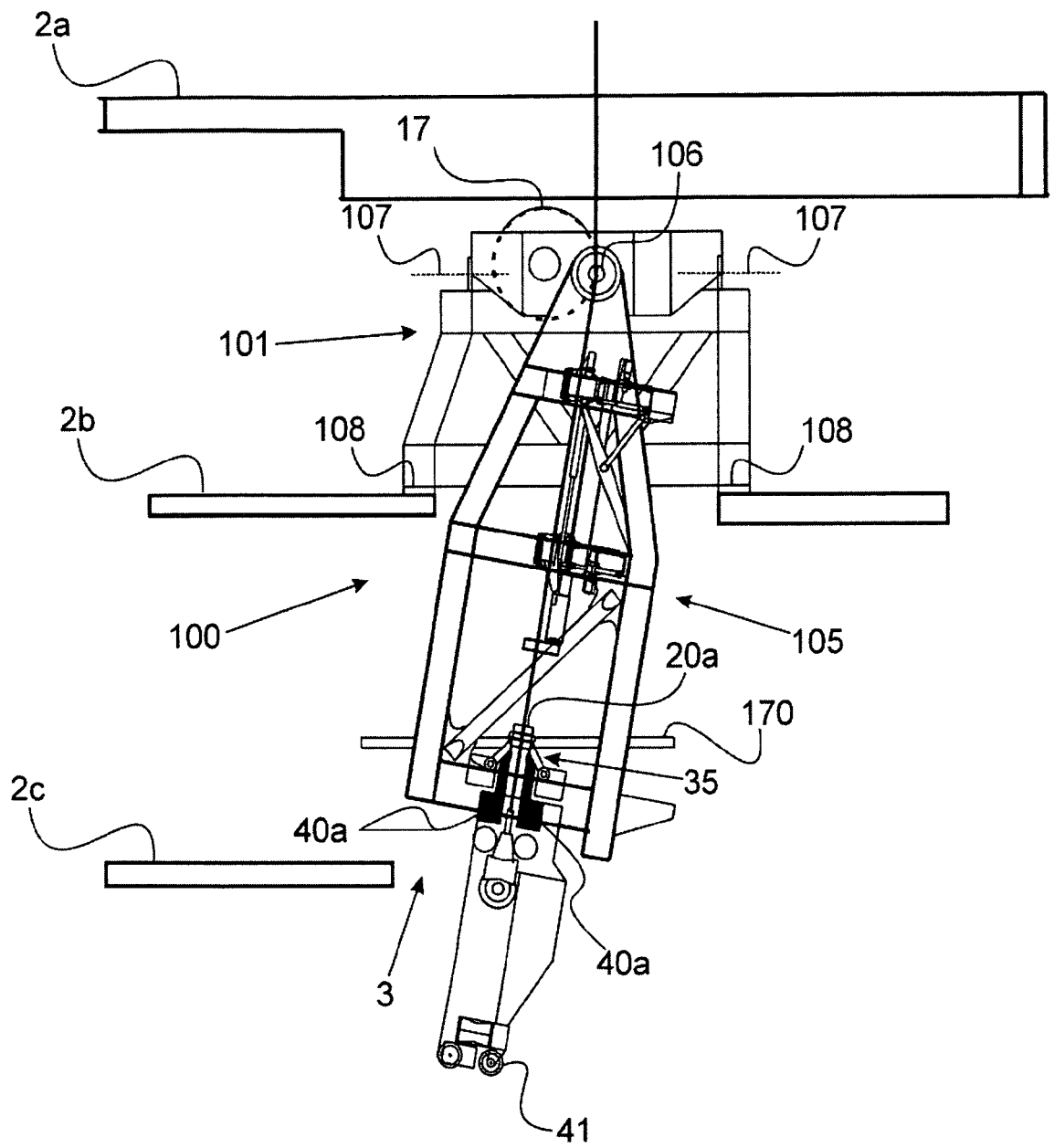
FIG. 3 depicts a side view of the exemplary embodiment of the pipe laying system depicted in FIG. 2.
Figure 4:
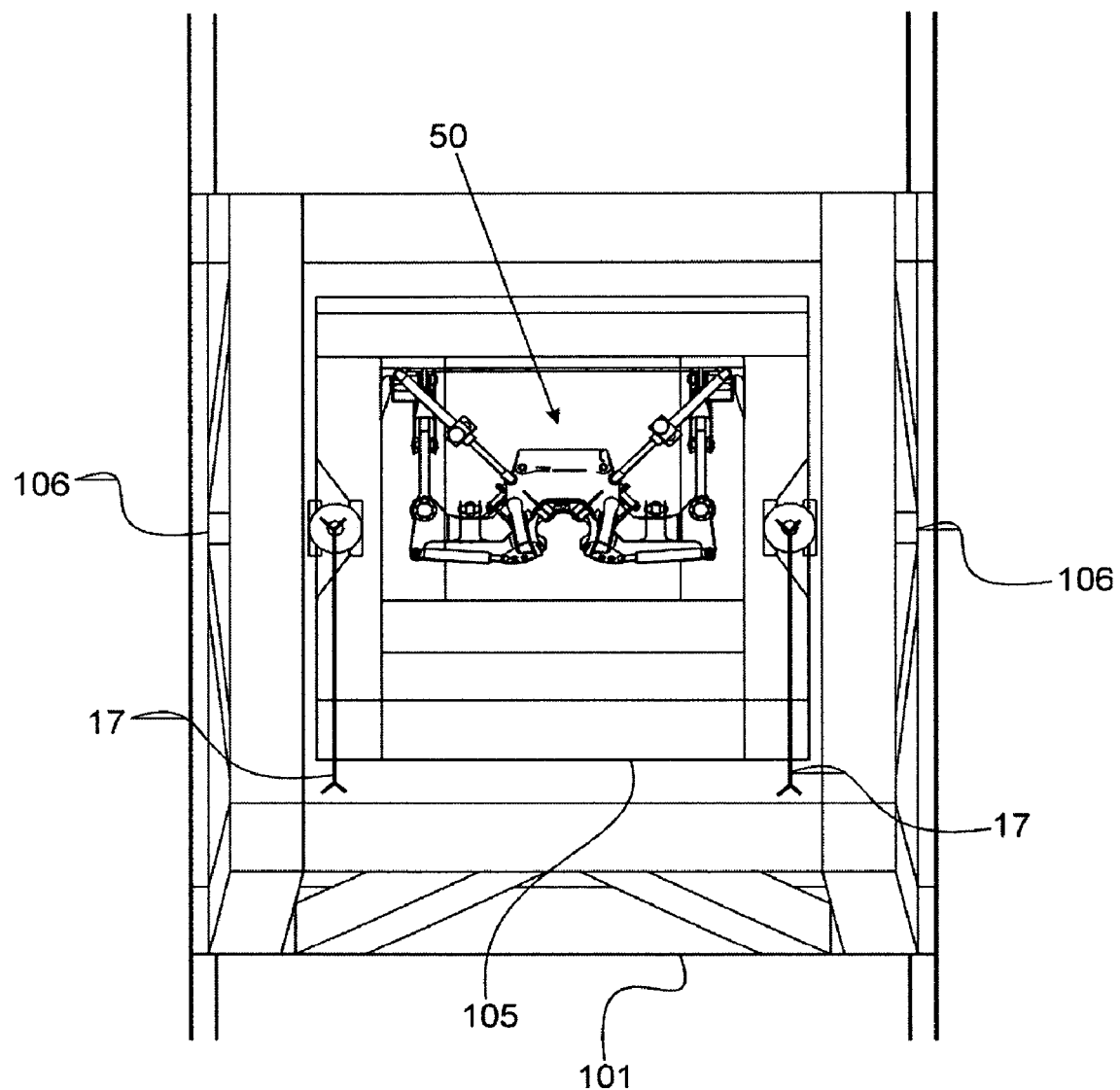
FIG. 4 depicts a top view of the exemplary embodiment of the pipe laying system depicted in FIG. 2.

Referring to FIG. 2, FIG. 3, and FIG. 4, FIG. 2 depicts a front view of an exemplary embodiment of the pipelaying system. FIG. 3 and FIG. 4 depict a side view and an above view, respectively, of the pipelaying apparatus 100.

The pipelaying apparatus 100 includes a main supporting structure 101. FIG. 2 depicts the main supporting structure 101 in the form of a box frame of beams. The main supporting structure 101 is supported on the lower deck 2b of the vessel. It must be understood that main supporting structure 101 can be supported on any suitable deck.

The pipelaying apparatus 100 includes a pivotable structure 105 that is supported pivotably by the main supporting structure 101.

The pivotable structure 105 is pivotable with respect to the main support structure 101 about two perpendicular pivot axes 106 and 107. The connection provides a gimbal connection between the pivotable structure 105 and the main support structure 101. In an alterative embodiment, a single pivot axis or a non-pivoting axis is included.

The static clamp 35 is arranged on the pivotable structure 105 near the lower end so that the orientation of the clamp 35 is the same as the orientation of the structure 105. As can be seen in FIG. 2 and FIG. 3, the static clamp 35 includes movable clamp members 35a disposed around the pipeline 20. The clamp members 35a engage beneath a collar 20b fitted on the pipeline 20 near the uppermost end thereof. In this embodiment, the movable clamp members 35a are pivoting levers that pivot about an associated axis at a lower end 37 while the top end engages on the collar 20b. The collars 20b and 20c are integral, wherein collar 20c has a larger diameter than collar 20b. Other arrangements, such as an arrangement wherein the collars are spaced further apart, are possible.

The mobile clamp 40 includes movable clamp members 40a disposed around the pipeline 20. The mobile clamp 40 engages beneath a collar 20c fitted on the pipeline 20 just below the collar 20b. The clamp 35 and/or clamp 40 can be a friction clamp design. The friction clamp design obviates the need for collars or like protrusions on the pipeline.

FIG. 2 and FIG. 3 depict end terminals 15a of cable 15 connecting the cables 15 to the clamp 40 at opposite sides thereof. FIG. 2 and FIG. 3 depict two sets of rollers 41 at spaced apart locations. Each set of rollers 41 includes several rollers 42 engaging the outside of the pipeline 20.

In FIG. 2 and FIG. 3, cable sheaves 17 are visible. The cable sheaves 17 act as mobile cable guides. The path of the mobile clamp supporting cables 15 essentially intersects the pivot axis 106 of the pivotable structure 105. This is most advantageous because now the pipeline 20 is not subjected to any bending forces arising from the cable supporting cables forces.

A pipe section alignment station 50 is arranged on the pivotable structure 105 above the static clamp 35. The pipe section alignment station 50 is used to align the lowermost end of a pipe section 21 with respect to the uppermost end 20a of the previously launched pipeline 20. Such pipe section alignment stations 50 allow for an accurate positioning so that high quality welding can be achieved. Pipe section alignment stations are well know in the art.

As can be seen in FIG. 2 and FIG. 3, the main supporting structure 101 is slidable with respect to the lower deck 2b. For this purpose, friction reducing devices 108, such as rollers, slide plates or the like, are positioned between the structure 101 and the lower deck 2b. The lower deck 2b can be embodied as another vessel structure element.

A work platform 170 can be positioned horizontally at the height of the upper end 20a of the pipeline 20 to facilitate an easy and safe access to the pipeline 20.

Figure 5:
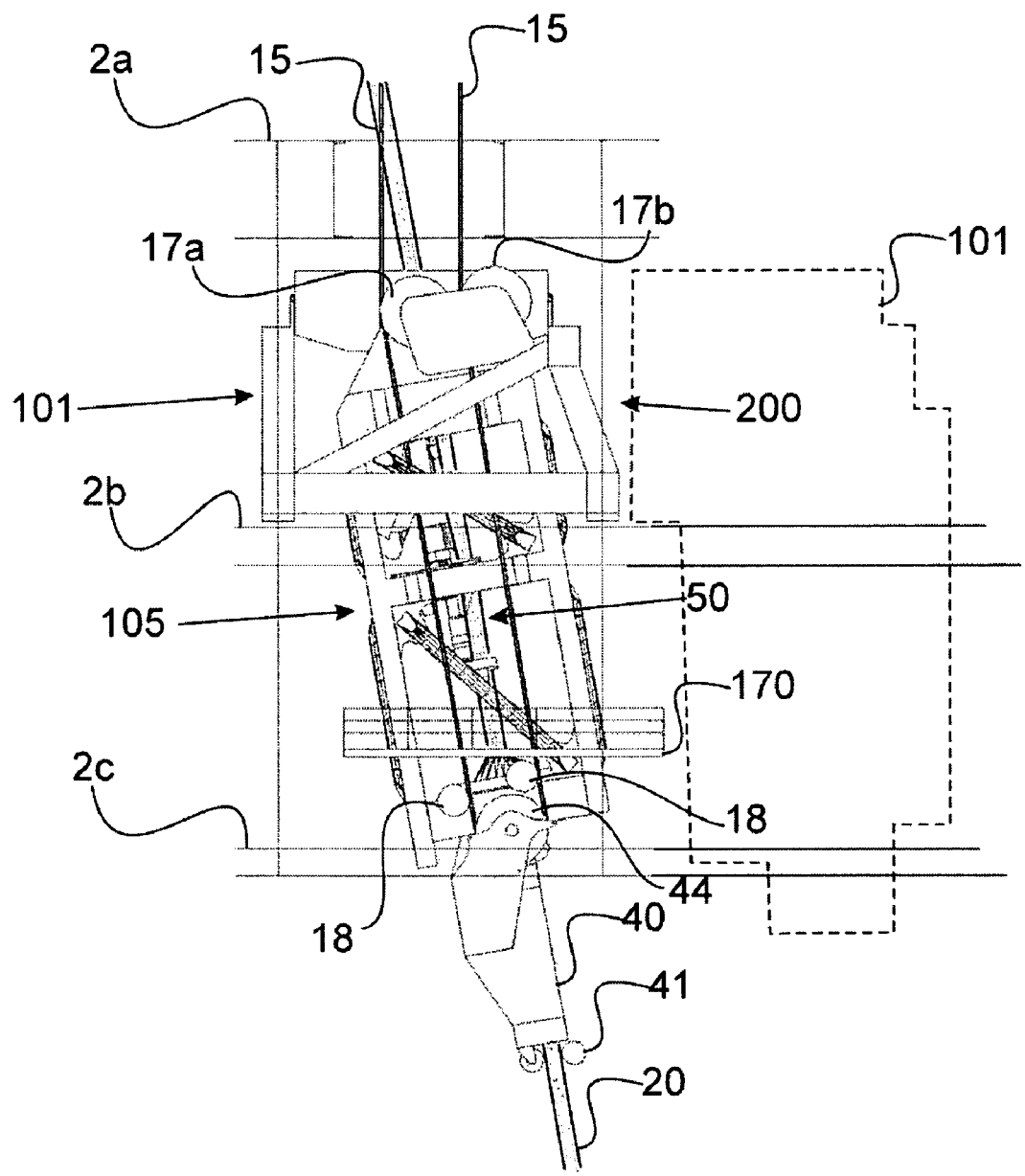
FIG. 5 depicts a side view of another exemplary embodiment of the pipelaying system.
Figure 6:
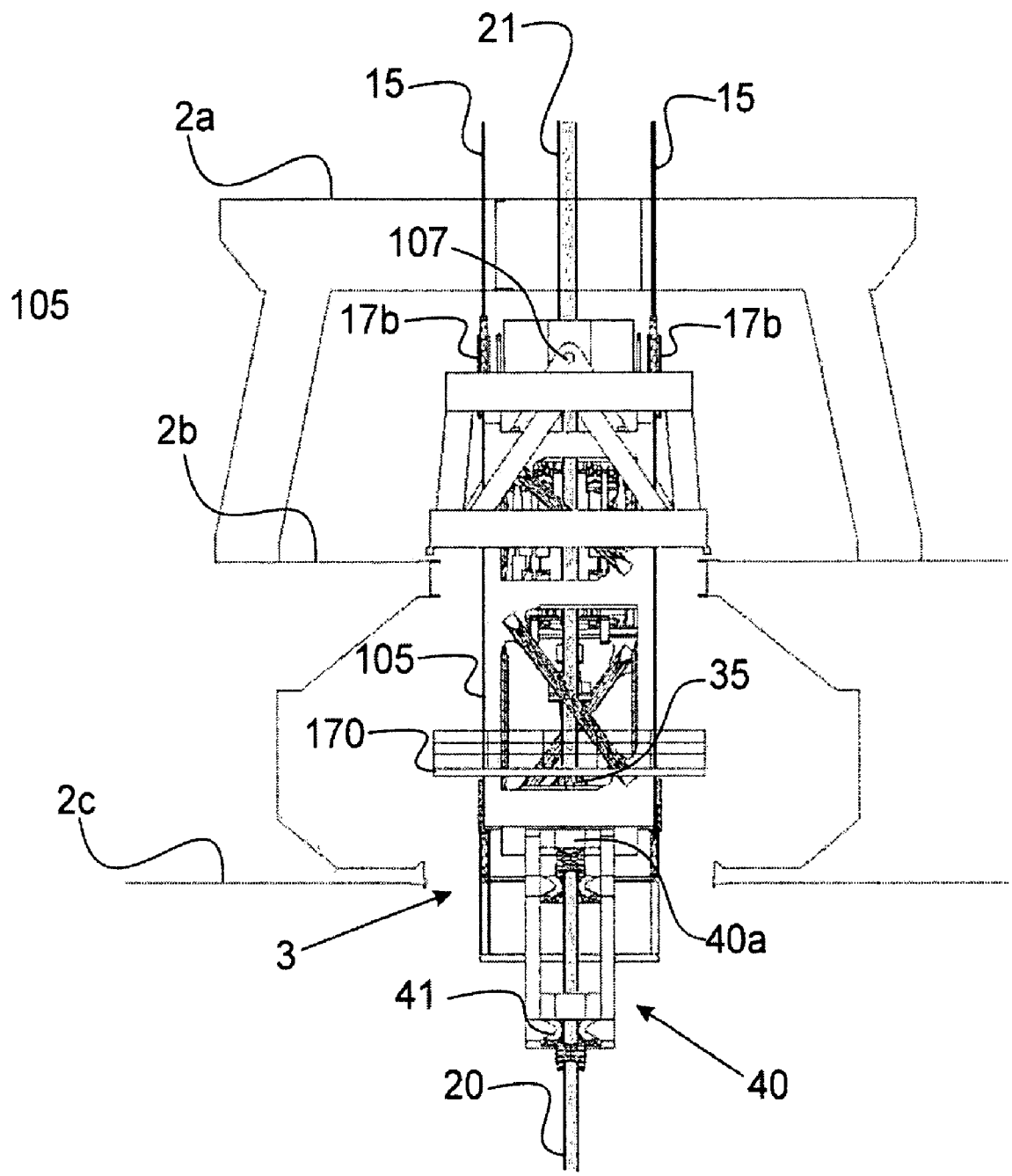
FIG. 6 depicts a front view of the exemplary embodiment of the pipe laying system depicted in FIG. 5.

FIG. 5 and FIG. 6 depict a different embodiment of the pipelaying apparatus 200. Parts having a design and/or function similar to those of FIG. 2, FIG. 3, and FIG. 4 have been numbered with the same reference numeral.

In FIG. 5 and FIG. 6, mobile clamp 40 has a cable sheave 44 at opposite sides, so that each cable 15 can be arranged in a double fall arrangement. A double fall arrangement entails that one end is fixed to the vessel and the other end is fixed to the cable 11 via, for example, a spreader 14. For this reason, two cable guiding sheaves 17a and 17b are arranged near the pivot axes of the pivoting structure 105 with respect to structure 101. Lower cable guide sheaves 18 are arranged near the lower end of pivoting structure 105. The advantage is that with the same hoisting force in cable 11, a double force can be hoisted with cable 15. This is especially advantageous when laying large diameter pipe in very deep water where the loads are very high.

FIG. 5 depicts that the pipe laying apparatus 200 as displaceable between an operational position to affect the pipelaying and a non-operational position (shown in broken lines) with respect to the moonpool 3. The positioning allows non-operational position drilling operations to be performed through the moonpool 3. The positioning obviates the need to remove the apparatus, at least the main and pivoting structures 101 and 105, if drilling operations are to be carried out.

Those skilled in the art will appreciate that instead of using the drill hoist system 10, one or more dedicated winches can be used for lowering and raising the mobile clamp 40. Such winch or winches can be arranged on a deck remote from the pivoting structure 105. The winch or winches for the mobile clamp can also arranged on the pivoting structure 105 itself.

Figure 7:
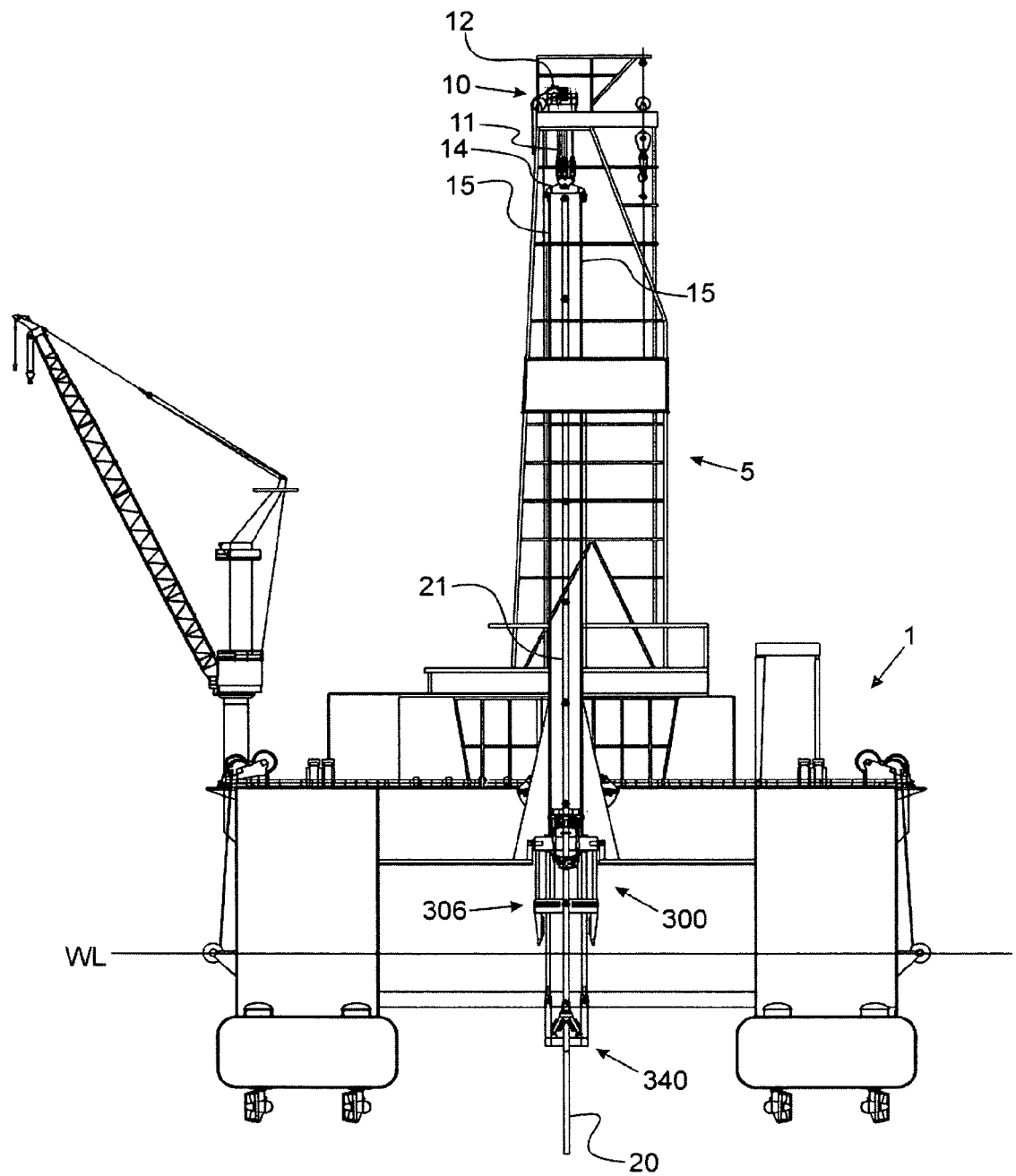
FIG. 7 depicts a semi-submersible rig provided with another embodiment of a pipe laying system.

FIG. 7 depicts the embodiment of semi-submersible rig 1, such as the rig depicted in FIG. 1, wherein the rig is equipped with another embodiment of the pipe laying system as will be explained in detail below. When possible the same reference numerals are used to indicate the same or similar features as depicted in the previous figures.

FIG. 7 depicts the pipe laying system 300 arranged and construed for vertical or near vertical laying of an offshore pipeline. The system 300 includes a main supporting structure 301 and a pivotable structure 305. The pivotable structure 305 is provided with a static clamp 306 and a mobile clamp 340.

Figure 9:
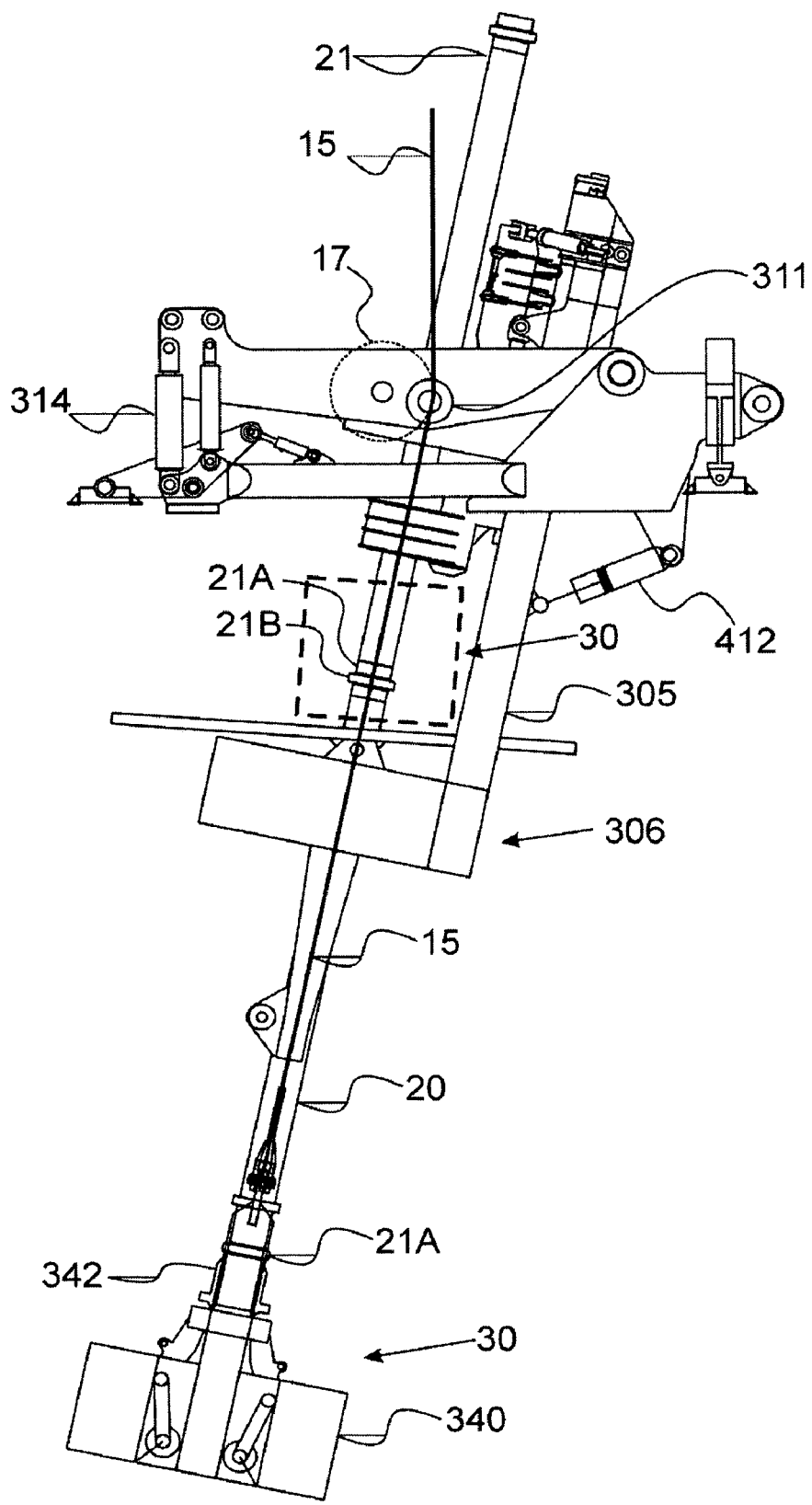
FIG. 9 depicts a side view of the exemplary embodiment of the pipe laying system depicted in FIG. 8.

Referring to FIG. 9, each pipe section 21 can include a collar 21a welded to the pipe section 21. Typically, the collar 21a is a forged metal collar. The depicted collar 21a has an annular protrusion 21b with a bottom side 21c that forms a common support surface for clamp members, such as the mobile clamp 340 and/or the static clamp 306.

The static clamp 306 has clamp members 307 that operated by associated actuators, typically hydraulic actuators. The actuators ensure that the clamp members 307 can move between a secured state, wherein the clamp members 307 engage under protrusion 21B (see FIG. 11), and a released state (see FIG. 13), wherein the clamp members 307 are away from the pipeline 20.

The mobile clamp 340 has pipeline engaging members 341. Depicted in FIG. 8, the engaging members are articulated arms with rollers engaging on the pipeline 20. There can be a multitude of engaging members attached to the mobile clamp 340.

The mobile clamp 340, in a manner similar to the static clamp 306, has clamp members 342 operated by associated hydraulic actuators 343 so that the clamp members 342 can move between a secured state, wherein the clamp members 342 engage under protrusion 21b, and a released state (see FIG. 11), wherein the clamp members 342 arc away from the pipeline 20. The mobile clamp can engage the same surfaces as the static clamp, such as a pipeline protrusion.

Within the scope of these embodiments, clamping does not mean the pipe must be held on the basis of friction. For example, the figures depict the pipe collar resting upon the static clamp and the mobile clamp. The pipe is, therefore, not held on the basis of friction. The mobile clamp can engage on another collar than the static clamp, such as the collar of a pipe section beneath the pipe section upon which the static clamp is engaged.

In an alternative embodiment, the static clamp and mobile clamp can be replaced by a static pipeline support and a mobile pipeline support.

Figure 8:
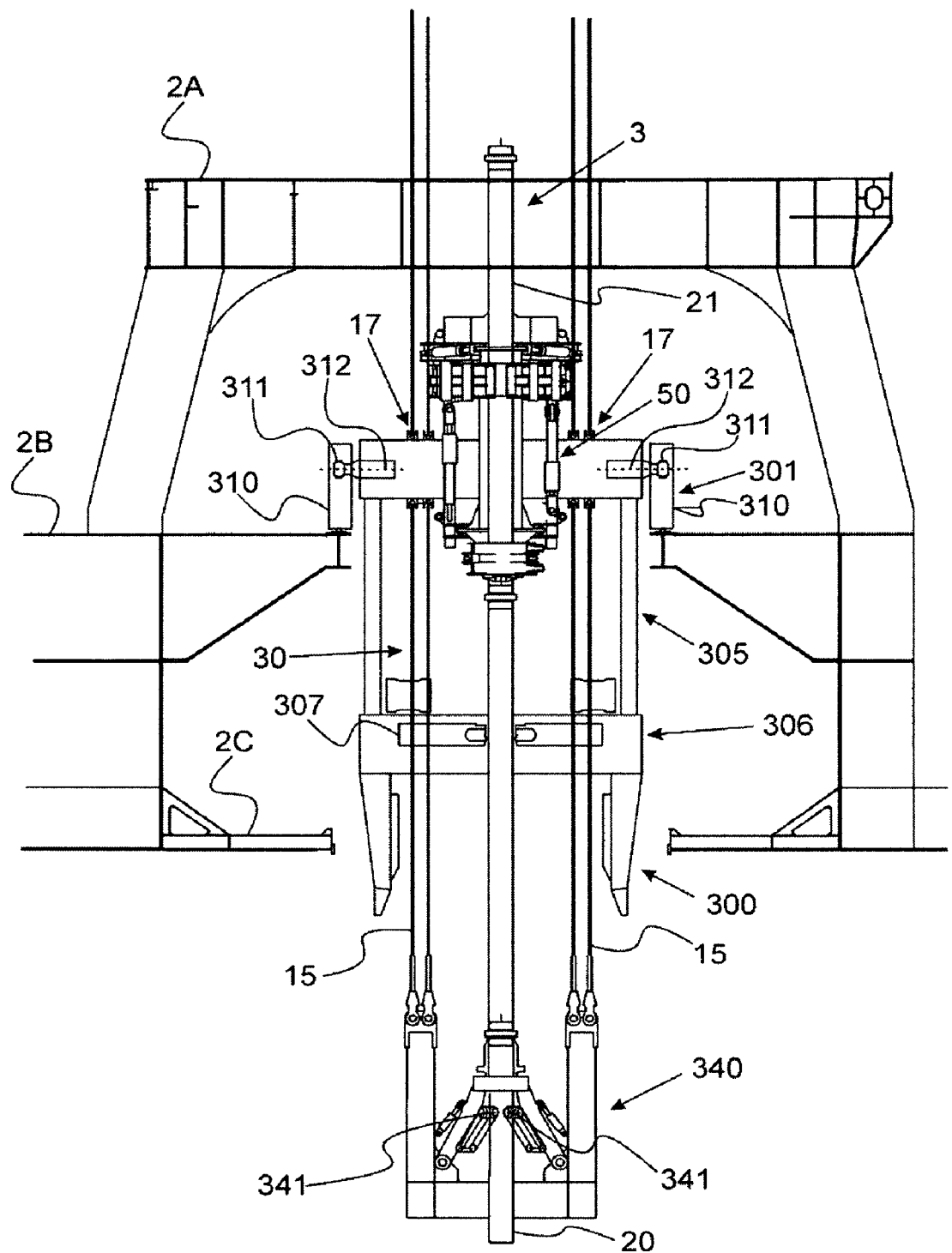
FIG. 8 depicts a front view of the exemplary embodiment of the pipe laying system depicted in FIG. 7.
Figures 10A, 10B, 10C:
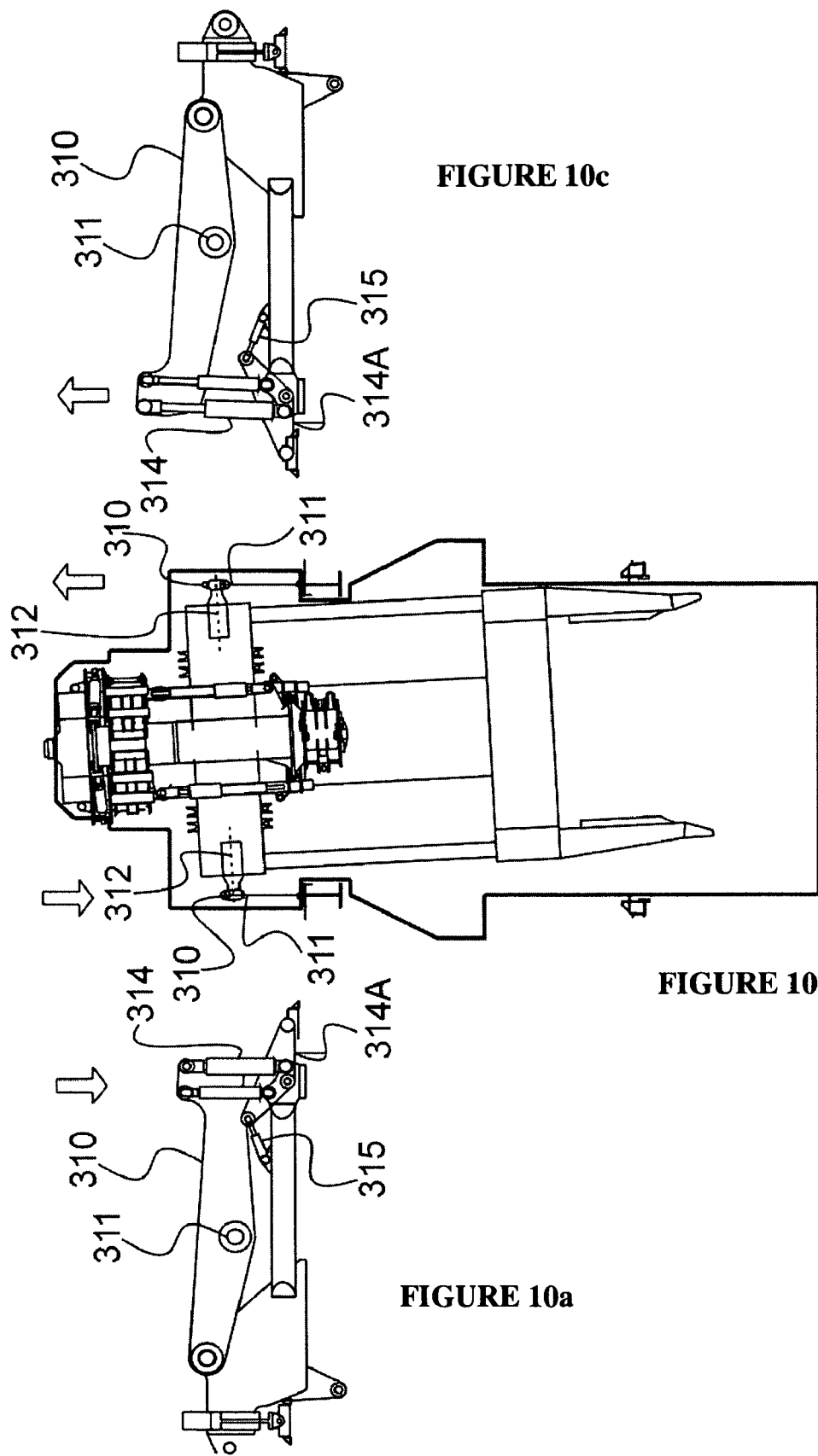
FIG. 10a, FIG. 10b, and FIG. 10c illustrate the exemplary embodiment of the pipe laying system depicted in FIG. 8 with an inclined orientation of the pivotable structure.

As depicted in FIG. 8 and FIG. 9, two cable parts 15 can be attached to each side of the mobile clamp 340. FIG. 10a, FIG. 10b, and FIG. 10c illustrate the exemplary embodiment of the pipe laying system depicted in FIG. 8 with an inclined orientation of the pivotable structure.

FIG. 11 through FIG. 19 depict a manner of laying of an offshore pipeline using the exemplary embodiment of the pipe laying system depicted in FIG. 8.

Figures 11, 12:
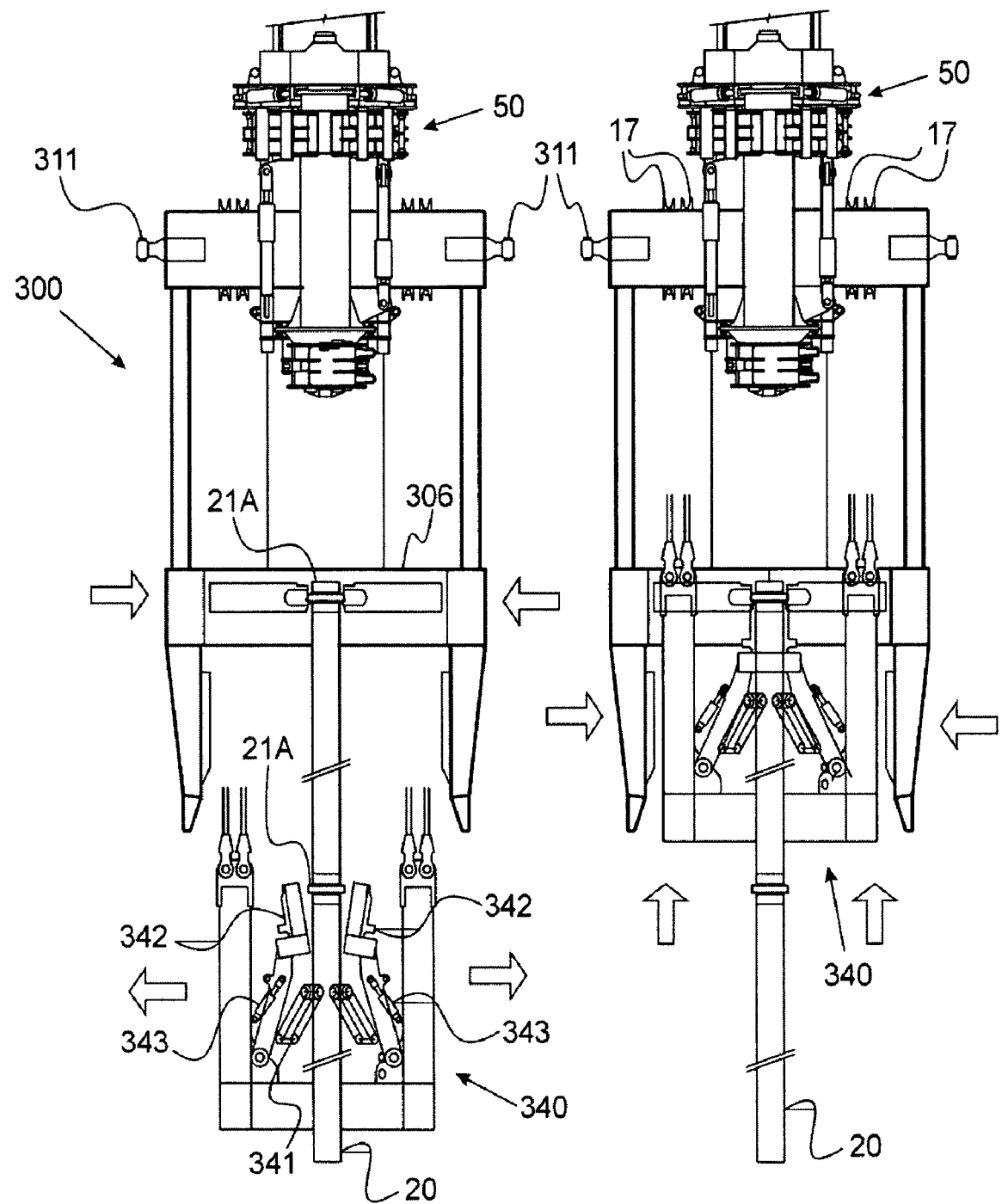
FIG. 11 through FIG. 19 depict a manner of laying of an offshore pipeline using of the exemplary embodiment of the pipe laying system depicted in FIG. 8.

In FIG. 11, a previously launched pipeline 20 is supported by static clamp 306 engaging on collar 21a at the uppermost end of the pipeline 20. The mobile clamp 340 is in a lower position and has been released from the pipeline 20.

The mobile clamp 340 is moved back to a clamping position using the mobile clamp hoist 10. In the clamping position, the mobile clamp 340 engages the collar 21a of the previously launched pipeline 20. A clamping position is depicted in FIG. 12, wherein both the clamp members 342 of the mobile clamp 340 and the clamp members 307 of the static clamp 306 engage the same collar 21a.

Figure 13:
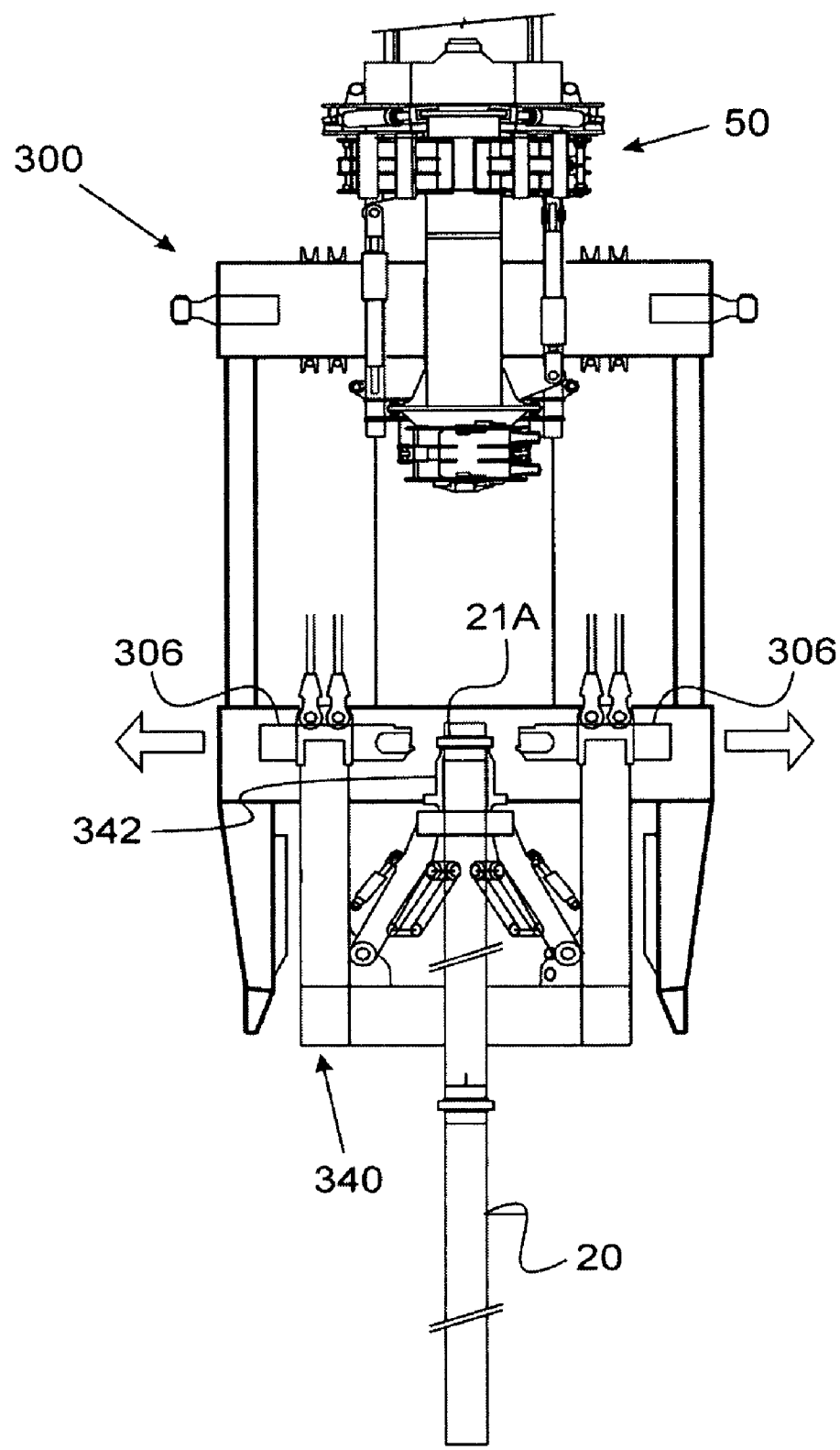

The weight of the pipeline 20 is brought to bear on the mobile clamp 340 so that the clamp members 307 can be moved to the release position thereof as shown in FIG. 13. By using the hoisting capacity of the winch 10, the mobile clamp 340 and the offshore pipeline 20 are supported, as shown in FIG. 14.

Figure 14:
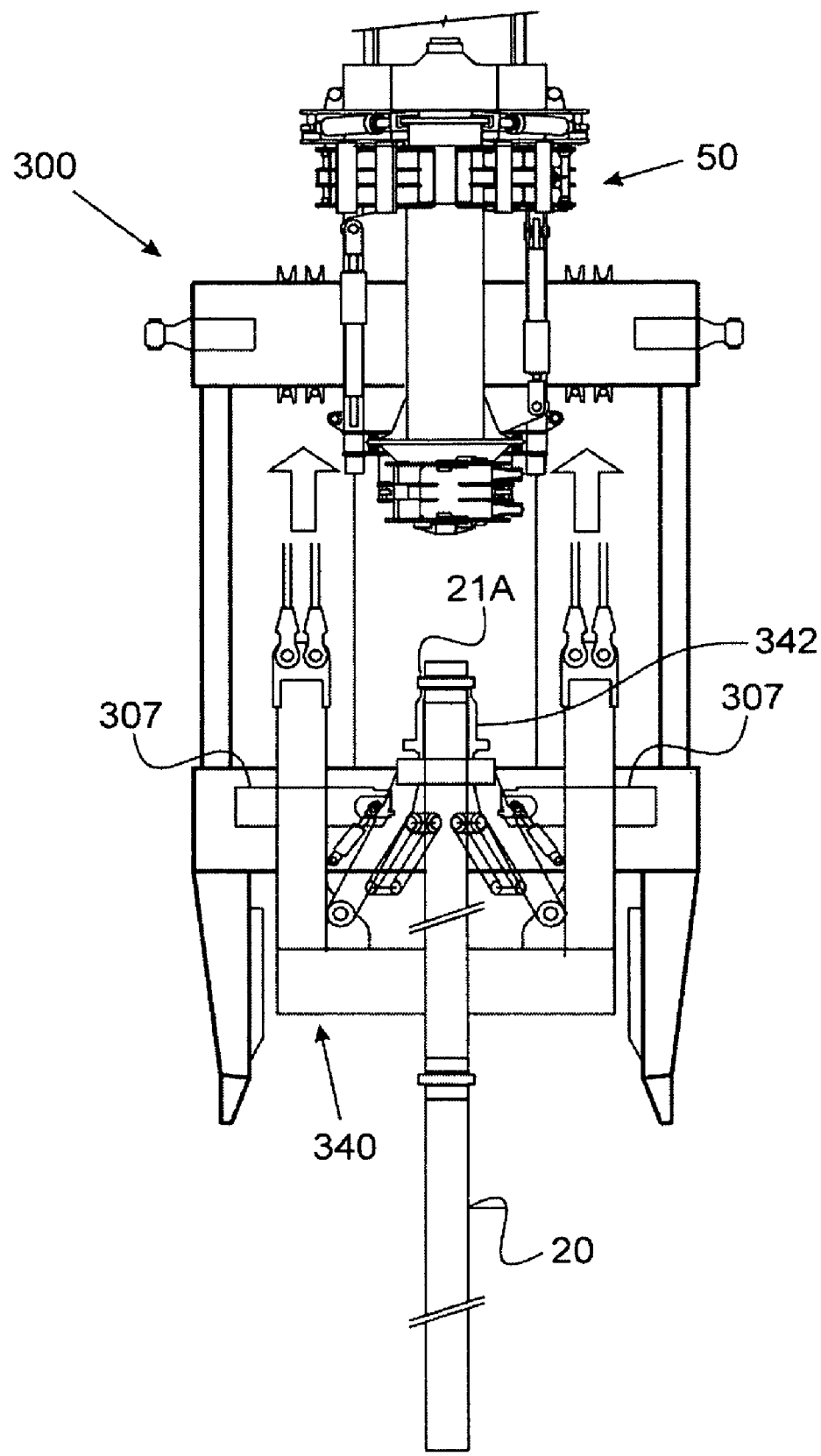
Figure 15:
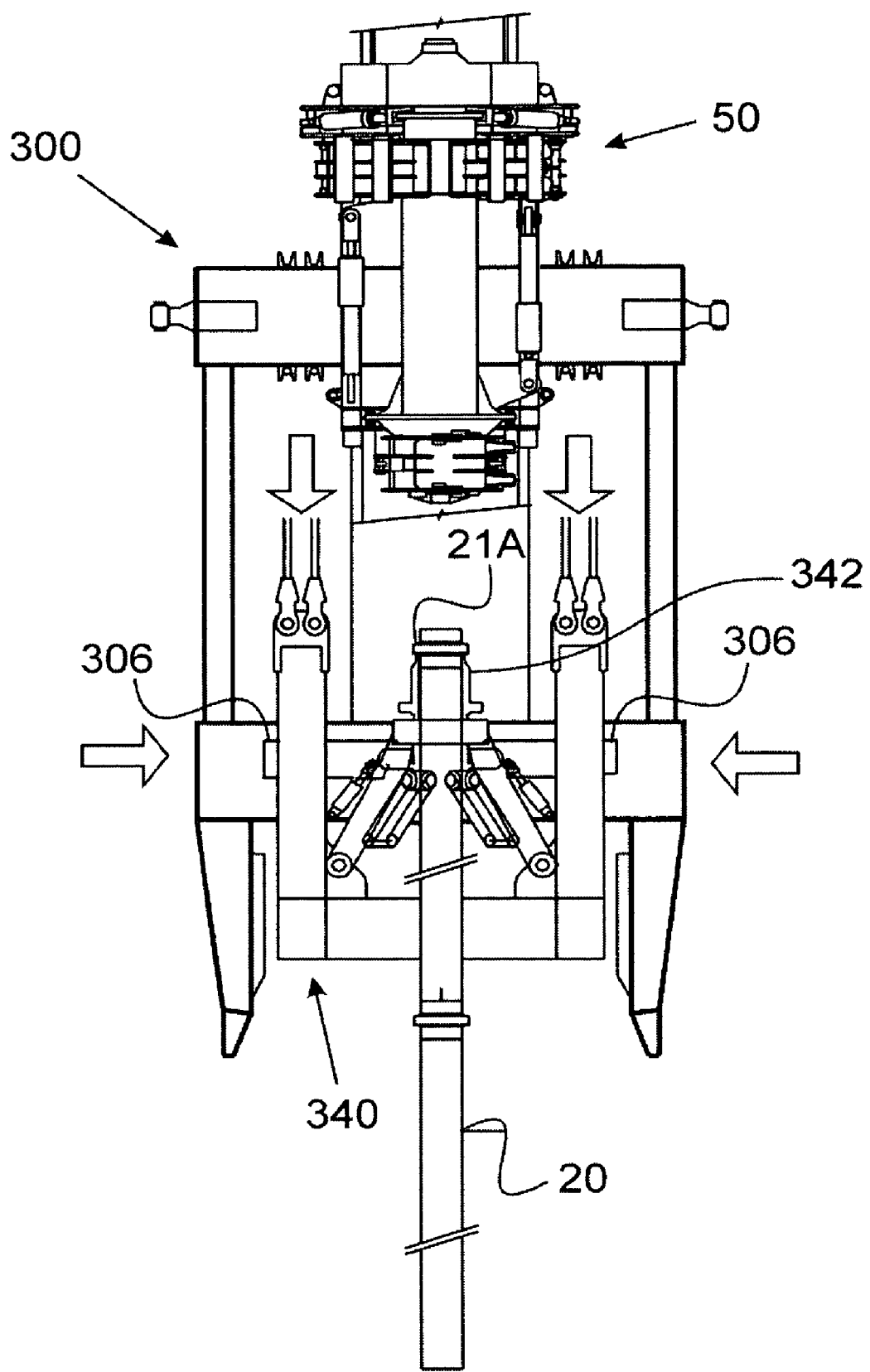

In the example depicted in FIG. 14, the mobile clamp 340 is raised such that the static clamp 306 engages under a corresponding part of the mobile clamp 340. The mobile clamp is then slightly lowered so the mobile clamp 340 then is supported on the static clamp 306 and held securely thereby (see FIG. 15).

Supporting the mobile clamp 340 using the static clamp 306b has the advantage of providing a very stable orientation for the collar 21a since welding operations have to be performed for connecting new pipe section 21 to the collar 21a. Also the construction of the pipelaying system 300 can be considerably lighter and smaller.

Figures 16, 17:
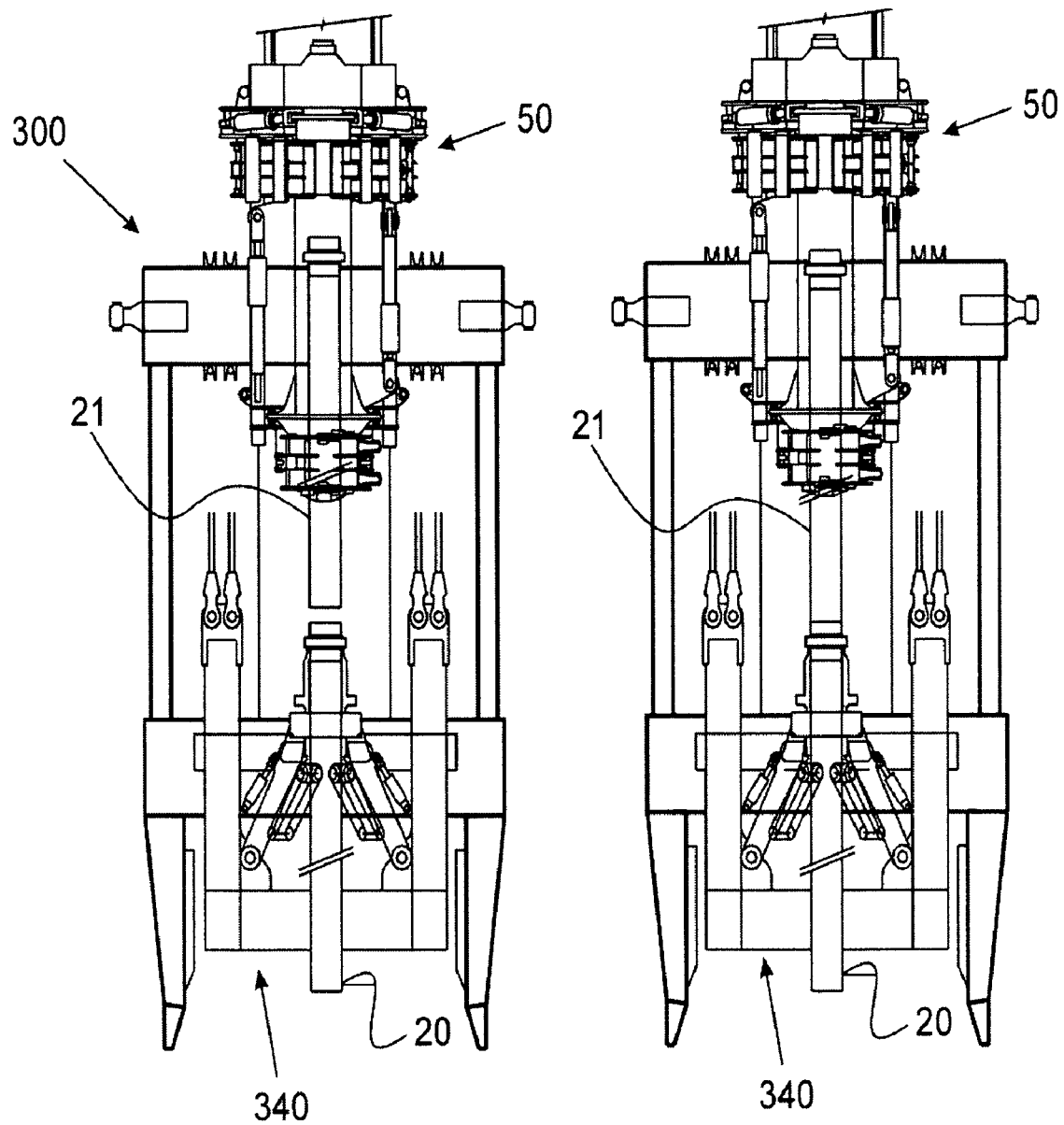
Figures 18, 19:
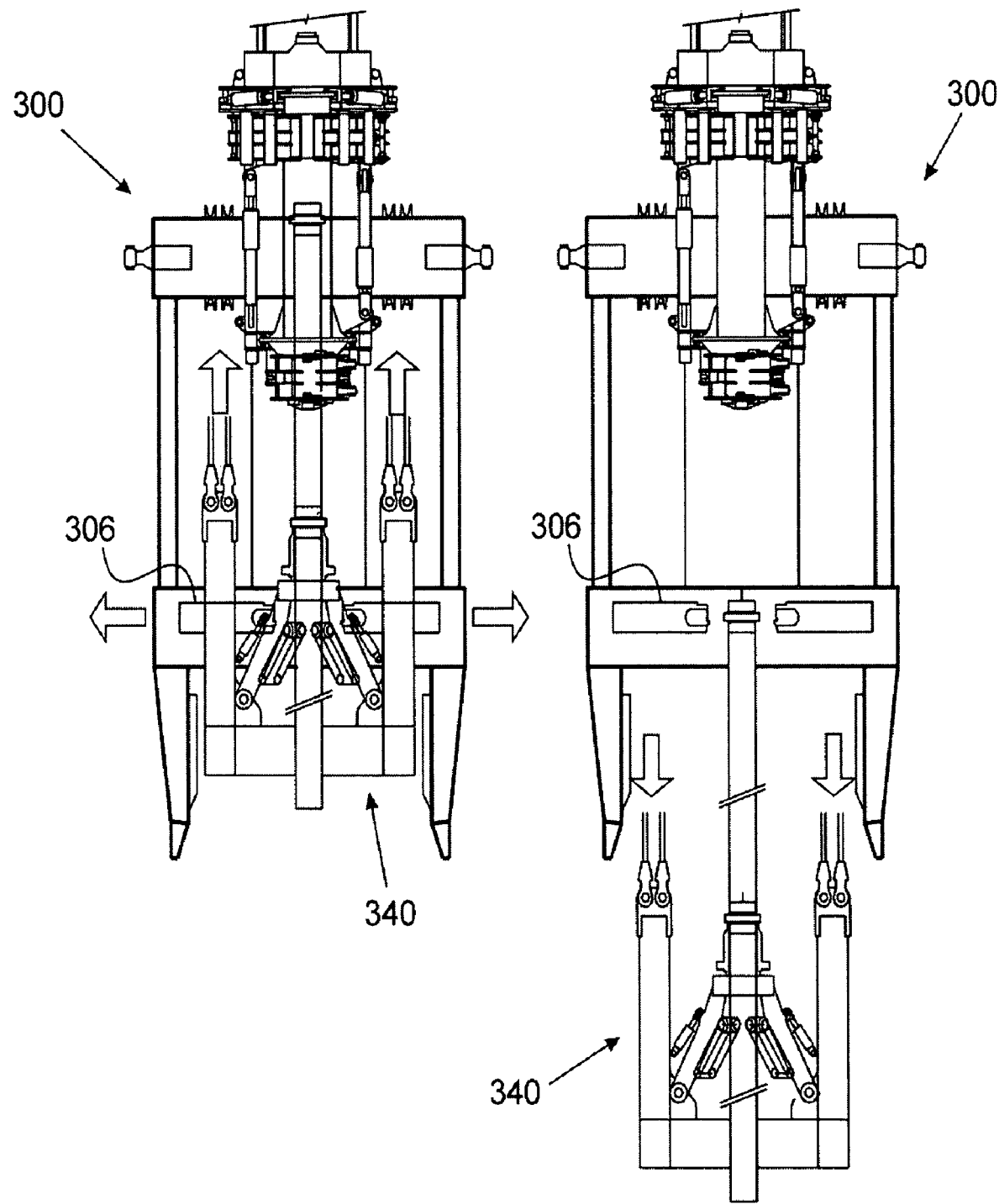

In FIG. 16, the new pipe section 21 is brought above the previously launched pipeline 20 and aligned therewith accurately using pipe aligning station 50 as depicted in FIG. 17. The connection is made through welding or otherwise.

By slightly raising the mobile clamp 340, the weight is relieved from the static clamp 306. By relieving the weight, the static clamp 306 can be moved to a released state (see FIG. 18). The pipeline 20 can then be is lowered by suitable lowering of the mobile clamp 340 until the uppermost collar 21a is at the height of the static clamp 306. The collar 21a can then be clamped using the static clamp and the sequence described above repeated.

As seen in FIG. 14 through 18, the static clamp 306 allows at least a part of the mobile clamp 340 to pass upwards by the static clamp 306 so that the mobile clamp and the offshore pipeline clamped thereby reach the raised connecting position.

The sequence depicted in FIG. 11 through FIG. 19 can be advantageous independent of the fact that the mobile clamp 340 is guided by the pipeline 20 or by another structure, such as a stinger that possibly extends into the water.

Returning to FIG. 8, FIG. 9, FIG. 10a, FIG. 10b, and FIG. 10c, the main support structure 301 can be provided with two movable support members 310 extending at opposite sides of the pivotable structure 305. In the figures, the two movable support members 310 are exampled as arms.

The pivotable structure 305 is connected to each support member 310 by a pivot connection 311 allowing the pivotable structure 305 to pivot about a pivot axis 312 with respect to the main support structure 301. The pivot axis 312 extends between the pivot points provided by the pivot connections 311.

The support members 310 are movable to allow the associated pivot connections 311 to move independently from one another. Typically, the pivot connections 311 move in a vertical direction so as to set a desired inclination of the pivot axis 312 with respect to the horizontal as illustrated in FIG. 10a, FIG. 10b, and FIG. 10c. In the figures, the left side member 310 has been moved down and the right side member 310 moved up so that the pivot axis 312 is inclined.

In FIG. 8, FIG. 9, FIG. 10a, FIG. 10b, and FIG. 10c, the two hydraulic actuators 314 are exampled moving each of the support members 310 in essentially vertical direction. The hydraulic actuators 314 of the support members 311 have lower ends connected to a pivotable bracket 314a. The pivotable bracket 314a is held by a corresponding hydraulic actuator 315. The actuators can have a variable volume fluid chamber in communication with each other. By having the fluid chambers of the actuators in communication with one another, the support members 311 can pivot freely of the pivotal structure 305 in a plane parallel to the pivot axis 312.

The pivotable structure 305 is essentially freely pivotable with respect to the main support structure 301. In one embodiment, the pivotable structure 305 is pivotable in both the plane at right angles to the pivot axis 312 and in a plane parallel to the pivot axis 312. Since the pivotable structure 305 is essentially freely pivotable, the pivotable structure 305 can assume and maintain an orientation corresponding to the orientation of the upper part of the previously launched pipeline 20 as the upper part is held securely by at least the static clamp 306. Any sea-state induced motions of the rig 1 are not transferred through the J-lay system to the previously launched pipeline 20. The pivotable structure 305 being essentially freely pivotable advantage provides the advantage that stresses in the pipeline 20 are lower than with prior art systems, wherein the J-lay system is affected by the sea-state induced motions.

Figure 20:
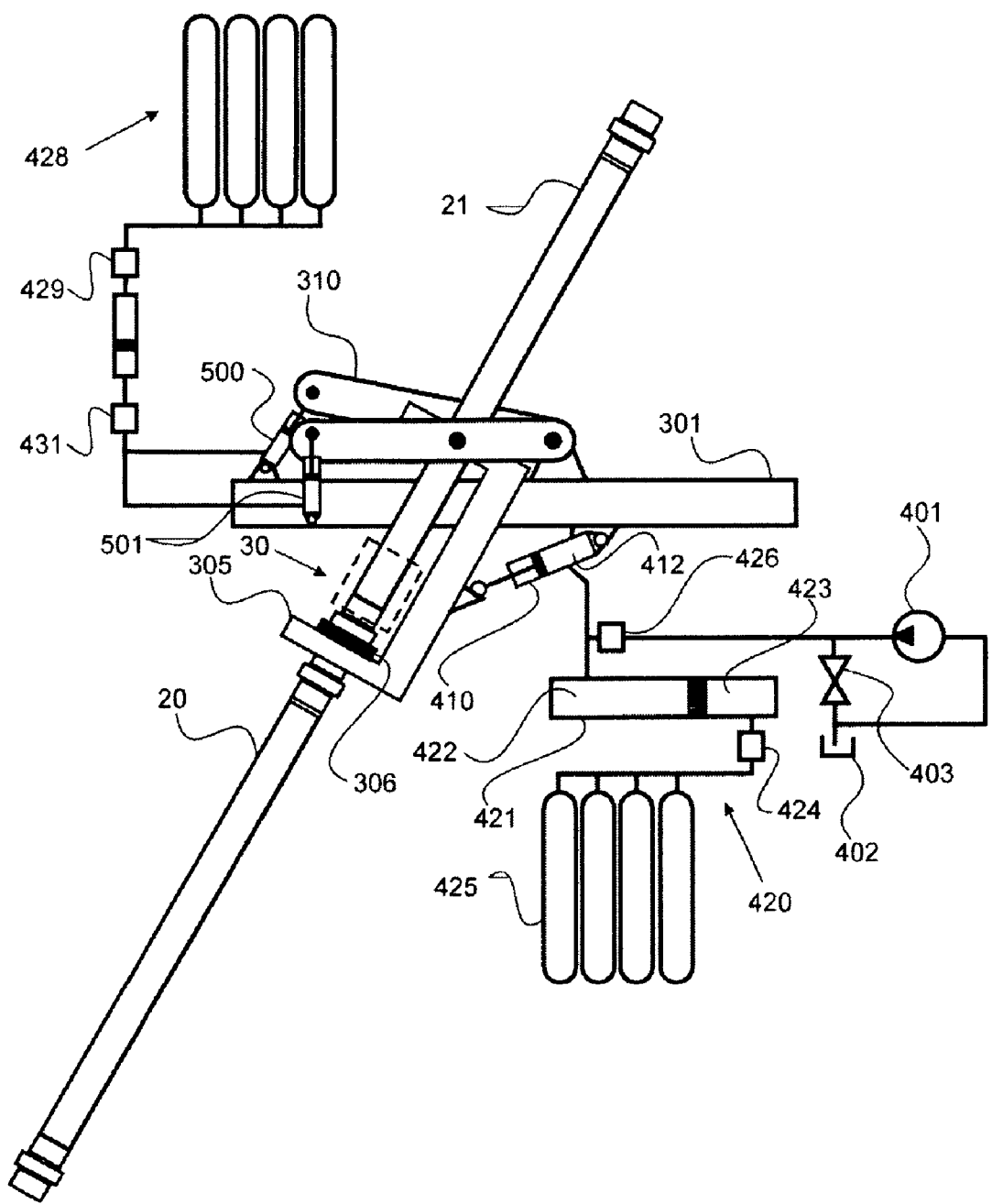
FIG. 20 depicts schematically a marine pipe laying system having means for maintain a desired orientation of the pivotable structure.

FIG. 20 depicts schematically a marine pipe laying system having means for maintain a desired orientation of the pivotable structure. The marine pipe laying system as discussed above with reference to FIG. 8 through FIG. 19 is applicable to other designs of systems for vertical or near vertical laying of an offshore pipeline.

FIG. 20 depicts the main supporting structure 301, the pivotable structure 305, the pipe connecting station 30, and the static clamp 306 arranged on the pivotable structure 305. The pipe section 21 is connected to an uppermost end of a previously launched pipeline 20.

A mobile clamp (not shown in FIG. 20) is used to secure in a releasable manner the previously launched pipeline. The mobile clamp is adapted to support the weight of the offshore pipeline as the offshore pipeline is released from the static clamp 306. The mobile clamp can be arranged to operate above the static clamp.

A hydraulic actuator 410 engages the pivotable structure 305 to set the desired orientation of the pivotable structure 305. An example of a desired orientation of the pivotable structure 305 is an angle of 10 degrees with respect to vertical. In order to set the desired orientation of the pivotable structure 305, a hydraulic pump 401, reservoir 402 and valve 403 are provided. A valve 425 can be used to disconnected or isolate the hydraulic pump 401.

Constant pressure device 420 is provided for maintaining a constant hydraulic pressure in the variable volume chamber 412. The constant hydraulic pressure corresponds to the desired orientation of the pivotable structure 305. The constant pressure device 420 can include an medium separator 421 with a variable volume hydraulic liquid chamber 422 connected to the variable volume chamber 412 of the hydraulic actuator 410 and a variable volume gas chamber 423 connected to a source of gas under a constant pressure. Typically, the source of gas is from a battery of pressurized gas canisters 425 interconnected to each other and to the variable volume chamber 423 through an optional pressure regulating valve 424. The hydraulic actuator 410 under constant pressure maintains a virtual stand still of the structure 305 with respect to the pipeline 20.

If the actuators 500 and 501 are connected directly to pivotable structure 305, the freely pivotable motion desired to compensate for sea-state induced motions is absent because the hydraulic actuator 410 would counteract such movement. In order to avoid this situation, pivotable structure 305 is supported by support beams 310 that are supported by main supporting structure 301. The beams 310 can move independently of each other. Actuators 500 and 501 are fluidly coupled to each other to form effectively a "virtual" fluid pivot point. The pivotable structure 305 can now freely move in any desired direction. The hydraulic actuators 500 and 501 are coupled to a constant pressure device 421 that can be set at any desired pressure through optional pressure regulating valves 429 and 431. Other methods widely known in the art can be used to control the pressure in the hydraulic actuators 500, 501 and 410.

While these embodiments have been described with emphasis on the preferred embodiments, it should be understood that within the scope of the appended claims the embodiments might be practiced other than as specifically described herein.

What is claimed is:

1. A marine pipelaying system for vertical or near vertical laying of an offshore pipeline, wherein the system comprises:

a. a main supporting structure;

b. a pivotable structure supported pivotably by the main supporting structure;

c. a pipe connecting station, wherein a pipe section is connected to an uppermost end of a previously launched pipeline;

d. a static clamp positioned above a mobile clamp adapted for releasably securing the uppermost end of the previously launched pipeline, wherein the static clamp is adapted to support the weight of the previously launched pipeline, wherein the static clamp is located below the pipe connecting station, and the static clamp is arranged on the pivotable structure;

e. the mobile clamp positioned below the static clamp adapted for releasably securing the previously launched pipeline at a position essentially below the static clamp, wherein the mobile clamp is adapted to support the weight of the offshore pipeline as the offshore pipeline is released from the static clamp; and f. a mobile clamp hoist comprising a mobile clamp cable connected to the mobile clamp, wherein the mobile clamp comprises pipeline engaging guide members adapted to engage the offshore pipeline and guide the mobile clamp back to the uppermost end, and wherein the mobile clamp hoist is adapted to raise and lower the mobile clamp and the offshore pipeline supported thereby, wherein the path of the mobile clamp cable intersects the pivot axis of the pivotable structure;

wherein the offshore pipeline is raised and lowered by releasing the static clamp and engaging the mobile clamp, at which point the mobile clamp hoist raises or lowers the mobile clamp which is engaged to the offshore pipeline;

wherein the offshore pipeline is engaged by the mobile clamp in a clamping position while the offshore pipeline is supported by the static clamp, whereafter the static clamp is released, whereafter the mobile clamp and pipeline are lowered to a lower position, wherein at the lower position the static clamp secures the offshore pipeline, and whereafter the mobile clamp is released from the offshore pipeline and the mobile clamp is moved back to the upper position, wherein the upper position is still below that of the static clamp.

2. The system of claim 1, wherein the guide members are rollers, caterpillars, friction reducing devices, or combinations thereof.

3. The system of claim 1, wherein the mobile clamp is adapted to engage on a pipeline protrusion.

4. The system of claim 3, wherein the pipeline protrusion is a collar, a buckle arrestor, or combinations thereof.

5. The system of claim 1, wherein the mobile clamp hoist comprises at least one mobile clamp winch for lowering the mobile clamp and the offshore pipeline supported thereby.

6. The system of claim 5, wherein the mobile clamp winch is mounted remote from the pivotable structure.

7. The system of claim 1, wherein the pivotable structure is pivotable with respect to the main support structure about two perpendicular pivot axes.

8. The system of claim 1, wherein the system further comprises a vessel, and wherein the main supporting structure is displaceable between an operational position to effect the pipelaying and a non-operational position.

9. The system of claim 1, further comprising a vessel comprising a moonpool, wherein the main supporting structure is displaceable between an operational position to affect the pipelaying and a non-operational position with respect to the moonpool.

10. The system of claim 9, wherein the vessel further comprises a vertical drilling structure associated with the moonpool, wherein the vertical drilling structure is adapted for drilling operations through the moonpool.

11. The system of claim 10, wherein the vertical drilling structure is a derrick structure comprising a lattice framework, and wherein releasable pipe section holding elements are arranged in the lattice framework.

12. The system of claim 9, wherein the vessel further comprises an upper deck structure and a lower deck structure spaced below the upper deck structure, wherein the main supporting structure is mounted on the lower deck structure essentially below the upper deck structure.

13. The system of claim 12, wherein the main supporting structure is provided with bearings adapted to engage the lower deck structure, wherein the bearings are rollers, caterpillars, friction reducing devices, or combinations thereof.

14. The system of claim 1, further comprising a pipe section holder adapted to hold the pipe section essentially aligned with the uppermost end of the previously launched pipeline.

15. The system of claim 1, further comprising a pipe section alignment station adapted to align the lowermost end of the pipe section with respect to the uppermost end of the previously launched pipe section.

16. The system of claim 15, wherein the pipe section alignment station is arranged on the pivotable structure.

17. The system of claim 1, further comprising a personnel accessible work platform near the static clamp.

18. A marine pipe laying system for vertical or near vertical laying of an offshore pipeline, wherein the system comprises:
   a. a main supporting structure;
   b. a pivotable structure supported pivotably by the main supporting structure;
   c. a pipe connecting station, wherein a pipe section is connected to an uppermost end of a previously launched pipeline,
   d. a static clamp positioned above a mobile clamp adapted for releasably securing the uppermost end of the previously launched pipeline, wherein the static clamp is adapted to support the weight of the previously launched pipeline, and the static clamp is located below the pipe connecting station;
   e. the mobile clamp positioned below the static clamp adapted for releasably securing the previously launched pipeline at a position essentially below the static clamp, wherein the mobile clamp is adapted to support the weight of the offshore pipeline as the offshore pipeline is released from the static clamp;
   f. a mobile clamp hoist comprising a mobile clamp cable connected to the mobile clamp, wherein the mobile clamp hoist is adapted to raise and lower the mobile clamp and the offshore pipeline supported thereby, wherein the path of the mobile clamp cable intersects the pivot axis of the pivotable structure;
   wherein the offshore pipeline is raised and lowered by releasing the static clamp and engaging the mobile clamp, at which point the mobile clamp cable raises or lowers the mobile clamp which is engaged to the offshore pipeline; and
   wherein the offshore pipeline is engaged by the mobile clamp in a clamping position while the offshore pipeline is supported by the static clamp, whereafter the static clamp is released, whereafter the mobile clamp and the offshore pipeline are raised from the clamping position to a raised connecting position, wherein the pipe section is connected to the uppermost end of the previously launched pipeline, whereafter the mobile clamp and the offshore pipeline are lowered to a lower position below the clamping position, wherein at the lower position the static clamp secures the offshore pipeline, and whereafter the mobile clamp is released from the offshore pipeline and the mobile clamp is raised back to the clamping position, wherein the clamping position is still below that of the static clamp.

19. The system of claim 18, wherein the static clamp is adapted to allow a portion of the mobile clamp to pass upwards through the static clamp so that the mobile clamp and the offshore pipeline reach the raised connecting position.

20. The system of claim 18, wherein the static clamp is adapted to support the mobile clamp in the raised connecting position, wherein the offshore pipeline is supported by the static clamp through the mobile clamp.

21. The system of claim 18, wherein the mobile clamp hoist comprises at least one mobile clamp supporting cable and at least one mobile clamp winch, wherein the mobile clamp supporting cable supports the mobile clamp.

22. A marine pipelaying system for vertical or near vertical laying of an offshore pipeline, wherein the system comprises:
   a. a main supporting structure to be mounted on a vessel;
   b. a pivotable structure supported pivotably by the main support structure;
   c. a pipe connecting station, wherein a pipe section is connected to an uppermost end of a previously launched pipeline;
   d. a static clamp positioned above a mobile clamp adapted for releasably securing the uppermost end of the previously launched pipeline, wherein the static clamp is adapted to support the weight of the previously launched pipeline, and the static clamp is located below the pipe connecting station and the static clamp is arranged on the pivotable structure;
   e. the mobile clamp positioned below the static clamp adapted for releasably securing the previously launched pipeline, wherein the mobile clamp is adapted to support the weight of the offshore pipeline as the offshore pipeline is released from the static clamp;

f. wherein the offshore pipeline is raised and lowered by releasing the static clamp and engaging the mobile clamp, at which point the mobile clamp hoist raises or lowers the mobile clamp which is engaged to the offshore pipeline, wherein the path of the mobile clamp cable intersects the pivot axis of the pivotable structure; and g. the pivotable structure freely pivots about at least one pivot axis by the main supporting structure, wherein the static clamp is arranged on the pivotable structure such that the pivotable structure comprises an orientation essentially independent from sea-state induced vessel motions.

23. A marine pipelaying system for vertical or near vertical laying of an offshore pipeline, wherein the system comprises:

a. a main supporting structure;

b. a pivotable structure supported pivotably by the main support structure;

c. a pipe connecting station, wherein a pipe section is connected to an uppermost end of a previously launched pipeline;

d. a static clamp positioned above a mobile clamp adapted for releasably securing the uppermost end of the previously launched pipeline, wherein the static clamp is adapted to support the weight of the previously launched pipeline, and the static clamp is located below the pipe connecting station and the static clamp is arranged on the pivotable structure;

e. the mobile clamp positioned below the static clamp adapted for releasably securing the previously launched pipeline, wherein the mobile clamp is adapted to support the weight of the offshore pipeline as the offshore pipeline is released from the static clamp;

wherein the offshore pipeline is raised and lowered by releasing the static clamp and engaging the mobile clamp, at which point the mobile clamp cable raises or lowers the mobile clamp which is engaged to the offshore pipeline;

f. and g. at least one hydraulic actuator engaging the pivotable structure for maintaining an orientation of the pivotable structure.

24. The system of claim 23, wherein the hydraulic actuator comprises a variable volume chamber filled with hydraulic fluid under a pressure, wherein the variable volume is dependent on the orientation of the pivotable structure.

25. The system of claim 24, wherein constant pressure is maintained in the variable volume chamber, wherein the constant pressure corresponds to the orientation of the pivotable structure.

26. A marine pipelaying system for vertical or near vertical laying of an offshore pipeline, wherein the system comprises:

a. a main supporting structure;

b. a pivotable structure supported pivotably by the main support structure;

c. a pipe connecting station, wherein a pipe section is connected to an uppermost end of a previously launched pipeline;

d. a static clamp positioned above a mobile clamp adapted for releasably securing the uppermost end of the previously launched pipeline, wherein the static clamp is adapted to support the weight of the previously launched pipeline, and the static clamp is located below the pipe connecting station;

e. the mobile clamp positioned below the static clamp adapted for releasably securing the previously launched pipeline, wherein the mobile clamp is adapted to support the weight of the offshore pipeline as the offshore pipeline is released from the static clamp;

wherein the offshore pipeline is raised and lowered by releasing the static clamp and engaging the mobile clamp, at which point the mobile clamp cable raises or lowers the mobile clamp which is engaged to the offshore pipeline; and f.

wherein the main supporting structure comprises at least two movable support members extending at opposite sides of the pivotable structure, wherein the pivotable structure is connected to each movable support member through pivot connections adapted to allow the pivotable structure to pivot about a pivot axis with respect to the main supporting structure, and wherein the movable support members move the pivot connections essentially in a vertical direction so as to set a desired inclination of the pivot axis with respect to horizontal.

27. The system of claim 26, further comprising at least one hydraulic actuator engaging each movable support members in essentially the vertical direction.

28. The system of claim 27, wherein the hydraulic actuator of one support member comprises a variable volume chamber in communication with a second variable volume chamber of the hydraulic actuator located opposite on the pivotable structure.

29. The system of claim 28, wherein the hydraulic actuator engages the pivotable structure to maintain the orientation of the pivotable structure, wherein the hydraulic actuator comprises a variable volume chamber filled with hydraulic fluid under a pressure, wherein the variable volume is dependent on the orientation of the pivotable structure.

* * * * *